Sept. 16, 1924.
J. B. McGHAN
THERMOMETER
Filed Jan. 10, 1922
1,508,465
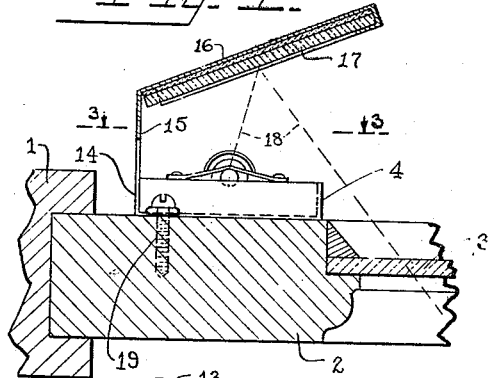
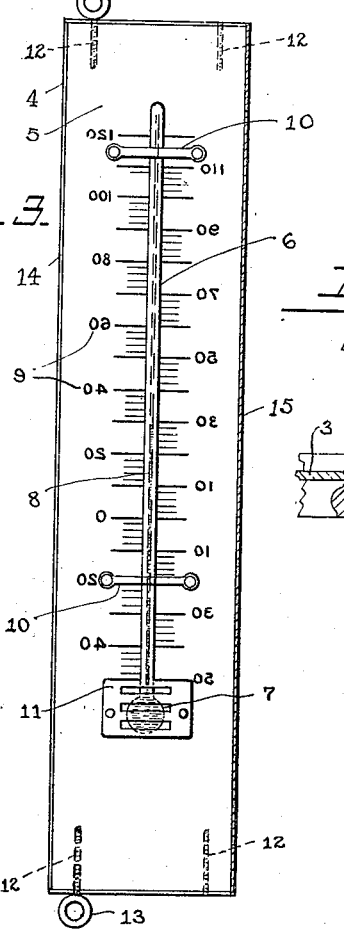
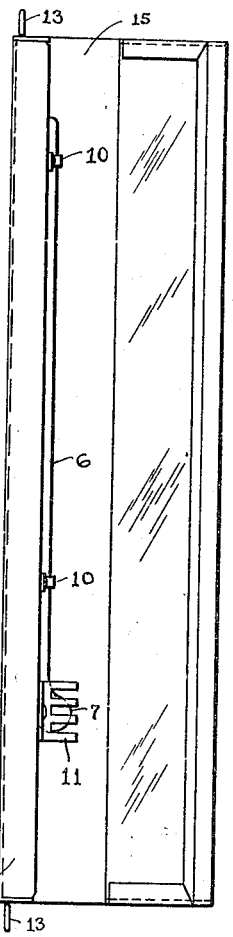
INVENTOR.
James B. McGhan
BY Morsell + Keeney
ATTORNEYS.

Patented Sept. 16, 1924.

1,508,465

UNITED STATES PATENT OFFICE.

JAMES B. McGHAN, OF KENOSHA, WISCONSIN, ASSIGNOR OF ONE-HALF TO WILLIAM F. MARTIN, OF KENOSHA, WISCONSIN.

THERMOMETER.

Application filed January 10, 1922. Serial No. 528,191.

*To all whom it may concern:*

Be it known that I, JAMES B. McGHAN, a citizen of the United States, and resident of Kenosha, in the county of Kenosha and State of Wisconsin, have invented new and useful Improvements in Thermometers, of which the following is a description, reference being had to the accompanying drawings, which are a part of this specification.

This invention relates to thermometers and has for its object to provide an instrument of this character which will be simple in construction, comparatively inexpensive to manufacture and more efficient in use than those which have been heretofore proposed. A further object of this invention is to provide a thermometer which is adapted to be positioned on the outside of a window or other opening and to be viewed therethrough from the interior of the room.

With these and other objects in view the invention consists in the novel details of construction and combinations of parts more fully hereinafter disclosed and particularly pointed out in the claims. Referring to the accompanying drawings, in which like numerals designate like parts in all the views:

Figure 1 is a fragmentary horizontal sectional view, partly in elevation, of a device made in accordance with the present invention, Fig. 2 is a side elevational view of the parts shown in Fig. 1, Fig. 3 is a front elevational view, partly broken away, of the parts shown in Fig. 1, and Fig. 4 is a view similar to Fig. 1, but showing the thermometer and its associated parts in a reverse position.

1 indicates the frame of a window or other opening, 2 the window sash and 3 the window pane, all of whch may be of any desired construction. 4 indicates a thermometer comprising the back 5 and the thermometer tube 6 having the usual bulb 7 filled with mercury or other suitable fluid which is adapted to rise in the bore 8 of the said tube 6 in the usual manner. The back 5 of the thermometer is calibrated in the usual manner and the graduations are indicated by numerals 9 which numerals however instead of being in the usual order are reversed or printed backwards for the purpose to be more fully disclosed below.

The said thermometer tube 6 may be secured to the back plate 5 by the clamps 10 and the bulb 7 thereof may be protected by the usual curved metallic member 11, as will be clear from the drawings.

The said back 5 is provided at each end with a pair of screw sockets 12 into which are adapted to fit a pair of screw eyes 13, best shown in Fig. 3.

The said back plate 5, which may be of wood, metal or other suitable material is preferably enclosed by a supporting casing 14 of sheet metal, which casing is extended along one side 15 to provide a support 16 for a mirror or other reflecting surface 17, see Figs. 1 and 2. The said mirror supporting portion 16 is preferably disposed at such an angle to the member 15 as to properly reflect the readings of the thermometer 4 approximately along the dotted lines 18 in Fig. 1, whereby the indications of the said thermometer may be viewed from within the room through the window pane 3 directly in the mirror 17.

The device is adapted to be attached directly to the outside of the window sash 2 by means of suitable screw or other fastenings 19, which pass through the screw eyes 13 as will be readily apparent.

In Fig. 1 the device is illustrated as being applied to the left hand side of the window sash. However should it be desired to attach it to the right hand side this may be accomplished by removing the eyelets 13 from the sockets 12 in which they are shown in Fig. 3 and placing them in the other pair of sockets 12 indicated thereon. The thermometer is then turned end for end in the supporting casing 14, whereupon the device may be attached to the opposite side of the window sash, as shown in Fig. 4.

It will thus be seen that this invention provides a thermometer which may be readily attached outside of a building where it will be subjected to the outside temperature and its indications may be readily viewed from within the room without opening the window. This is especially desirable on cold or stormy days when frequent readings of the thermometer are necessary.

It is obvious that those skilled in the art may vary the details of construction as well as the arrangement of parts without departing from the spirit of the invention and therefore it is not wished to be limited to the above disclosure, except as may be required by the claim.

What is claimed is:

A device of the class described comprising a thermometer having a back member bearing reversed indicating characters; a sheet metal casing receiving and holding said back member, one wall of said casing being extended beyond the face of said back member and bent at an obtuse angle in front of said back member, the edges of said obtuse portion being bent to provide flanges; a reflecting mirror embraced within said flanges, its entire back surface being engaged and supported by said obtuse portion; and means for readily detachably securing the device to a support.

In testimony whereof, I affix my signature.

JAMES B. McGHAN.